C. BARTELS.
SAFE BOLTWORK.
APPLICATION FILED MAY 5, 1913.

1,082,990.

Patented Dec. 30, 1913.

2 SHEETS—SHEET 1.

Witnesses:

Carl Bartels
Inventor
by James W. See
Attorney

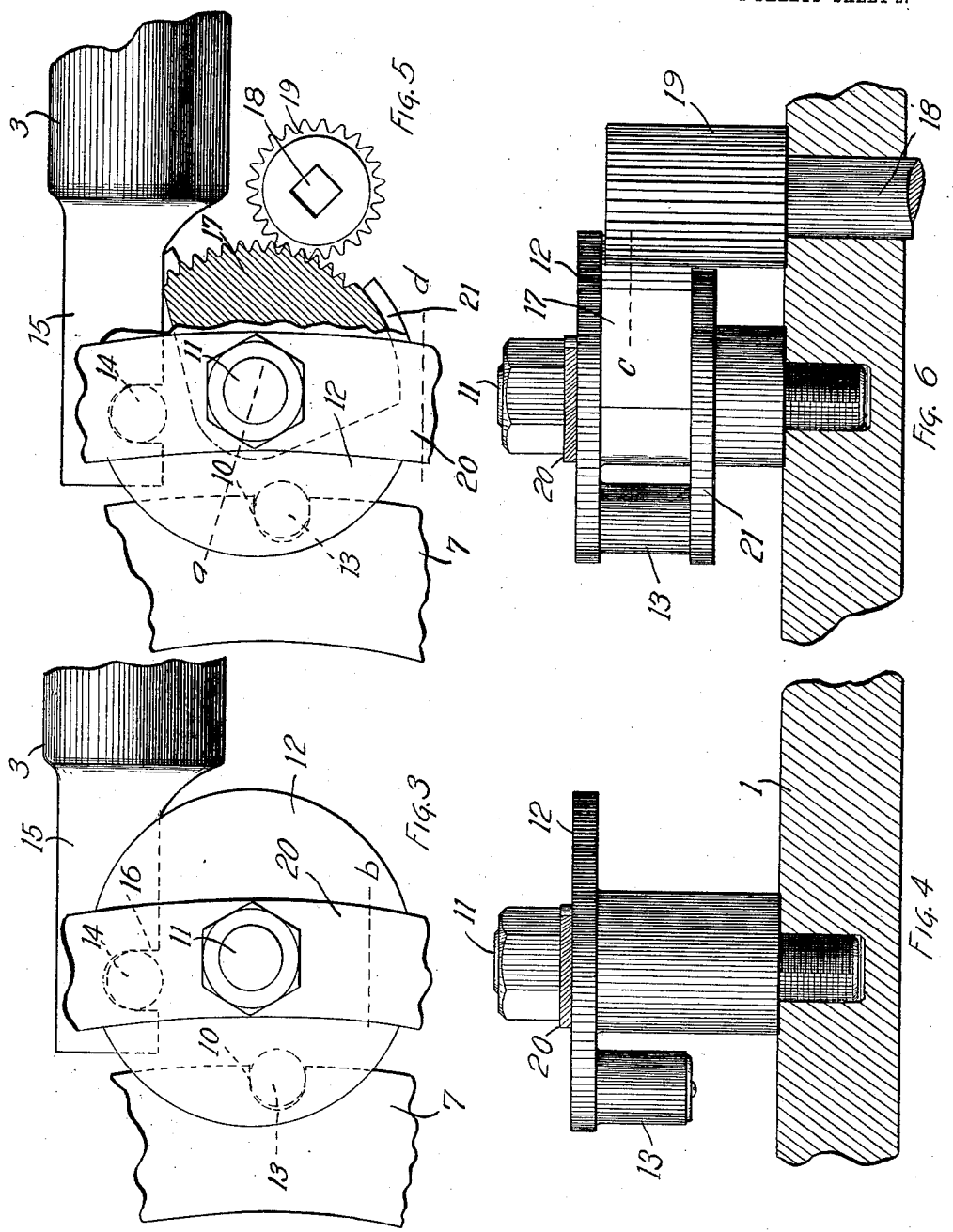

UNITED STATES PATENT OFFICE.

CARL BARTELS, OF HAMILTON, OHIO, ASSIGNOR TO THE MOSLER SAFE COMPANY, OF NEW YORK, N. Y.

SAFE-BOLTWORK.

1,082,990.  Specification of Letters Patent.  Patented Dec. 30, 1913.

Application filed May 5, 1913. Serial No. 765,439.

*To all whom it may concern:*

Be it known that I, CARL BARTELS, a citizen of the United States, residing at Hamilton, Butler county, Ohio, have invented certain new and useful Improvements in Safe-Boltwork, of which the following is a specification.

This invention pertaining to safe bolt work of round safe doors will be readily understood from the following description taken in connection with the accompanying drawings in which:—

Figure 1:
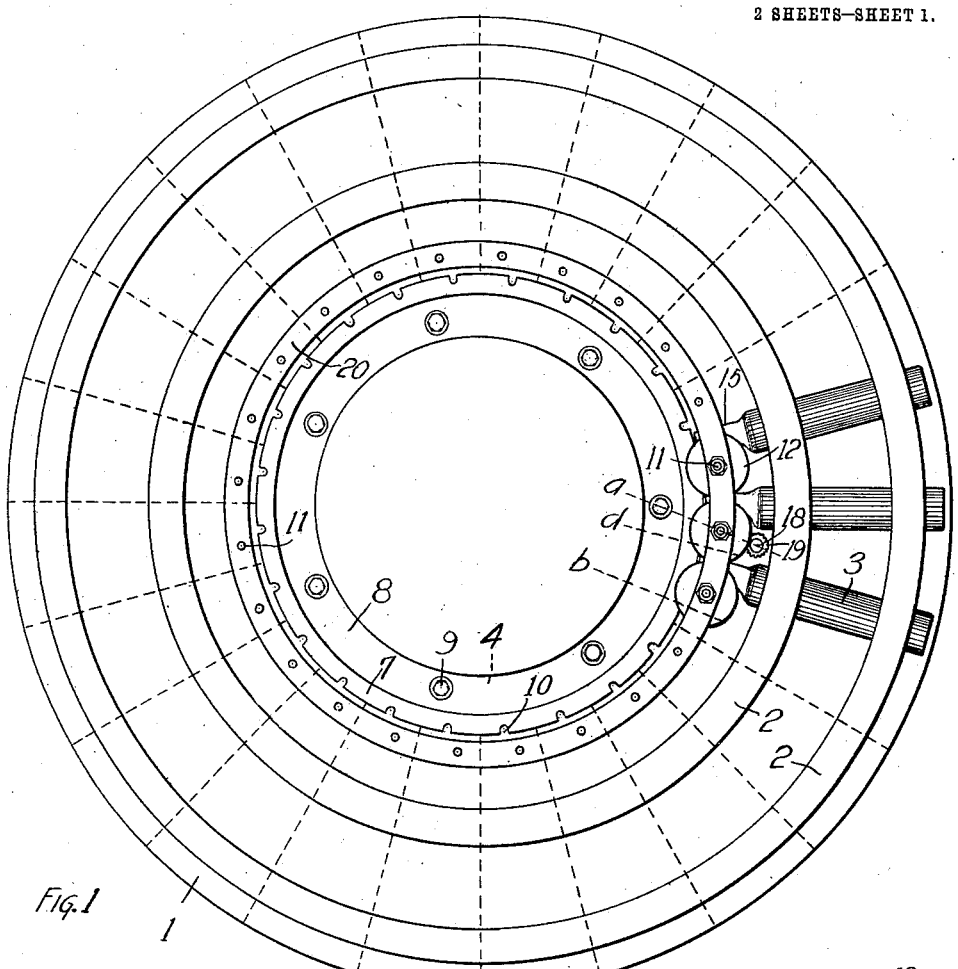
Figure 2:
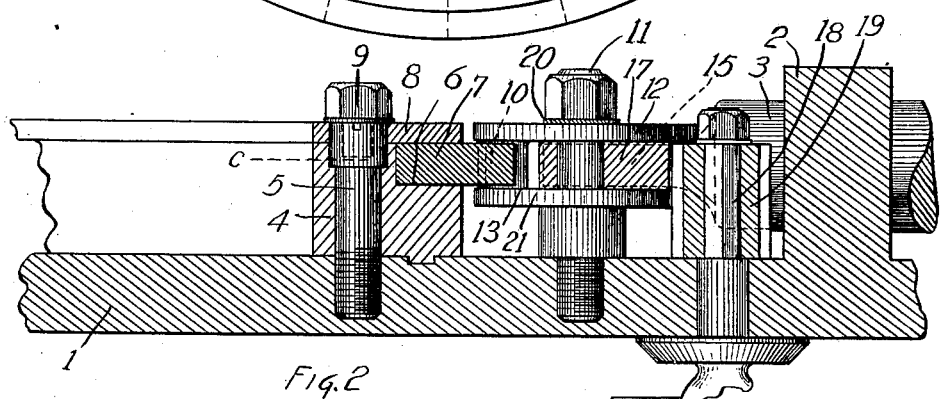

Figure 1 is a rear elevation of the backplate of a round safe door fitted with an embodiment of my improved bolt work; Fig. 2 a section thereof in the plane of line *a* of Figs. 1 and 5; Fig. 3 a plan, on an enlarged scale, of one of the bolt-throwing cranks; Fig. 4 a side elevation of one of the bolt-throwing cranks, the safety ring appearing in horizontal section in the plane of line *b* of Figs. 1 and 3; Fig. 5, a plan of the initial one of the bolt-throwing cranks, part appearing in vertical section in the plane of line *c* of Figs. 2 and 6; and Fig. 6, a side elevation of the initial bolt-throwing cranks, the safety ring appearing in horizontal section in the plane of line *d* of Figs. 1 and 5.

In the drawings:—1, indicates the back of a round safe door, which back may be the door itself or the back-plate not unusually provided upon the back of the door for carrying the bolt work; 2, a pair of rings concentrically carried by the back-member 1; 3, bolts adapted to slide radially through rings 2, there being as many of these bolts as desired, Fig. 1 illustrating three of the bolts complete, location for additional bolts being indicated by dotted radial lines; 4, a bearing-ring disposed against the rear face of the back-member, concentric with rings 2; 5, screws, securing the bearing-ring firmly to back-member 1; 6, a rabbet formed in the outer rear surface of the bearing-ring; 7, an actuating-ring fitted to turn freely in the rabbet of the bearing-ring; 8, a clip-ring lying to the rear of the bearing-ring and overlapping the actuating-ring; 9, screws passing through the clip-ring and anchored into the bearing-ring to hold the clip-ring in place, Fig. 2 illustrating these screws as going into the heads of screws 5; 10, notches in the periphery of the actuating-ring, there being one notch for each bolt; 11, a circumferential series of studs projecting rearwardly from the back-member around the actuating-ring; 12, a disk mounted to turn on each of studs 11, and overlying the actuating-ring; 13, a crank-pin preferably provided with an anti-friction sleeve, projecting rearwardly from each crank-disk, these crank-pins engaging the notches of actuating-ring 7; 14, a second crank-pin carried by each of the crank-disks and projecting forwardly therefrom, the two crank-pins of each disk being located at substantially ninety degrees from each other; 15, a shank projecting inwardly from each bolt, under its appropriate crank-disk; 16, a notch in each of these shanks, these notches engaging the appropriate crank-pins 14; 17, a toothed segment fast with one of the crank-disks 12; 18, a spindle mounted to turn in the back-member, its axis being disposed near to and parallel with stud 11 carrying that one of the crank-disks which is provided with the toothed segment; 19, a pinion fast on spindle 18 and engaging the toothed segment; 20, a keeper-ring disposed concentric to rings 2 and engaging the circular series of studs 11; and 21, a crank-disk connected with that particular one of the crank-disks 12 which is actuated by toothed segment 17, the pair of crank-disks formed by crank-disk 21 and its companion disk 12 straddling actuating-ring 7, the crank-pin 13 pertaining to these straddling crank-disks being connected to both disks.

If pinion 19 be turned, by any means whatever, it will cause the turning of the particular crank-disk which carries the toothed segment 17, and the crank-pin 13 of that crank-disk will cause the turning of actuating-ring 7. The turning of actuating-ring 7 will obviously bring about the turning of all of the rest of the crank-disks, and the turning of the crank-disks obviously brings about the endwise motion of the bolts, moving them outward for locking purposes and inwardly for unlocking purposes. The mounting of actuating-ring 7, in the bearing-ring 4 leaves a large clear space upon the back of rear member 1, on which may be mounted any locking mechanism usual in round-door safe construction, a condition not obtainable where the actuating-ring takes the form of a disk and turns upon a central pivot or stud.

The crank-disks are held in place by nuts upon the rear ends of the studs. In the absence of keeper-ring 20 the nuts would hold the crank-disks securely in place, but if in the course of time, one of these nuts became loose and displaced, a lockout might result. But in the present construction, involving keeper-ring 20 the displacement of a single nut or a number of nuts would not permit the damaging displacement of any crank-disk, indeed, it is obvious that the providing of nuts upon very few of studs 11 will be sufficient to maintain the keeper-ring in place and thus maintain the crank-disks in proper position.

When actuating-ring 7 is turned it acts, as has been before explained on the bolts, each crank-disk acting on one of the bolts. But the particular crank-disk to which operating power is applied as by means of the pinion 19, has an extraordinary duty to perform in that power must be transmitted through it sufficient to actuate the entire series of bolts. It is for this reason that the particular crank-disk in question is reinforced by the second crank-disk 21, these two crank-disks straddling actuating-ring 7.

I claim:—

1. Safe bolt work comprising, the back-member of a round safe door, concentric bolt-rings carried at the rear thereof, bolts fitted to slide radially in said rings, a shank projecting inwardly from each bolt, a crank-pin notch in the side of each shank, a circular actuating-device mounted for rotatory movement on said back-member inwardly of the ends of said shanks, notches in the periphery of the circular actuating-device, means for turning the actuating-device, and a crank device for each of said bolts supported by said back-member and having each a crank-pin engaging the notch in the shank of a bolt and a notch in said actuating device, combined substantially as set forth.

2. Safe bolt work comprising, the back-member of a round safe door, radially movable bolts carried thereby, a stud projecting from said back-member for each of said bolts, a rotatory actuating-device journaled on said back-member, transmission devices mounted on said studs and connecting said actuating-device with said bolts, a keeper-ring engaging the rear portion of said studs, and means for securing said keeper-ring to said studs, combined substantially as set forth.

3. Safe bolt work comprising, the back-member of a round safe door, concentric bolt-rings carried at the rear thereof, bolts fitted to slide radially in said rings, a rabbeted bearing-ring separably secured against the rear surface of said back-member, an actuating-ring mounted for rotatory motion in the rabbet of said bearing-ring, a clip-ring secured to the rear surface of said bearing-ring and projecting over said actuating-ring, and a transmission device between said actuating-ring and each of said bolts, combined substantially as set forth.

4. Safe bolt work comprising, the back-member of a round safe door, concentric bolt-rings carried at the rear thereof, bolts fitted to slide radially in said rings, a circular actuating-member mounted for rotatory motion on said back-member, concentric with and inwardly of said concentric rings, a shank projecting inwardly from each bolt and provided with a notch in its side a notch in said actuating-member for each of said bolts, a circular series of studs carried by said back-member between said actuating-member and said concentric ring, a crank mounted on each of said studs and having a crank-pin to engage a notch of the actuating-member, and another crank-pin to engage the notch of the appropriate bolt-shank, a toothed segment fast with one of said crank-disks, and a pinion mounted for rotatory motion on said back-member and engaging said toothed segment, combined substantially as set forth.

5. Safe bolt work comprising, the back-member of a round safe door, concentric bolt-rings carried at the rear thereof, bolts fitted to slide radially in said rings, a circular actuating-member mounted for rotatory motion on said back-member, concentric with and inwardly of said concentric rings, a shank projecting inwardly from each bolt and provided with a notch in its side, a notch in said actuating-member for each of said bolts, a circular series of studs carried by said back-member between said actuating-member and said concentric rings, a crank mounted on each of said studs and having a crank-pin to engage a notch of the actuating member, and a second crank-pin to engage a notch of a bolt-shank, a toothed segment fast with one of said cranks, a toothed pinion engaging said segment, a spindle for turning said pinion, and a second crank-member carried by the toothed segment and connected with the two crank-pins of the crank carrying the toothed segment, combined substantially as set forth.

CARL BARTELS.

Witnesses:
M. S. BELDEN,
WM. J. KLINGLER, Jr.